(12) United States Patent
Lee et al.

(10) Patent No.: US 10,412,400 B1
(45) Date of Patent: *Sep. 10, 2019

(54) MEMORY ACCESS ORDERING FOR A TRANSFORMATION

(71) Applicant: Ambarella, Inc., Santa Clara, CA (US)

(72) Inventors: Ellen M. Lee, Saratoga, CA (US); Yat Kuen Wong, San Jose, CA (US)

(73) Assignee: Ambarella, Inc., Santa Clara, CA (US)

( * ) Notice: Subject to any disclaimer, the term of this patent is extended or adjusted under 35 U.S.C. 154(b) by 507 days.

This patent is subject to a terminal disclaimer.

(21) Appl. No.: 14/575,185

(22) Filed: Dec. 18, 2014

Related U.S. Application Data

(63) Continuation of application No. 12/692,835, filed on Jan. 25, 2010, now Pat. No. 8,923,405.

(51) Int. Cl.
| | |
|---|---|
| *H04N 19/423* | (2014.01) |
| *H04N 19/60* | (2014.01) |
| *H04N 19/625* | (2014.01) |
| *H04N 19/18* | (2014.01) |

(52) U.S. Cl.
CPC .......... *H04N 19/423* (2014.11); *H04N 19/18* (2014.11); *H04N 19/60* (2014.11); *H04N 19/625* (2014.11)

(58) Field of Classification Search
CPC .... H04N 19/18; H04N 19/423; H04N 19/625; H04N 19/60
See application file for complete search history.

(56) References Cited

U.S. PATENT DOCUMENTS

| 4,591,979 | A | | 5/1986 | Iwashita ........................ 712/25 |
|---|---|---|---|---|
| 5,107,345 | A | | 4/1992 | Lee ................. 382/250 |
| 5,408,615 | A | * | 4/1995 | Ishikawa ................. G06F 13/28 710/26 |
| 6,421,385 | B1 | | 7/2002 | Uenoyama et al. ........ 375/240.2 |
| 6,992,673 | B2 | | 1/2006 | Oka et al. ..................... 345/531 |
| 2004/0100472 | A1 | * | 5/2004 | Linzer ..................... G09G 5/39 345/536 |
| 2005/0071542 | A1 | * | 3/2005 | Weber ................. G06F 12/0215 711/105 |
| 2006/0103659 | A1 | * | 5/2006 | Karandikar ............... G06F 3/14 345/558 |
| 2008/0049035 | A1 | * | 2/2008 | Kuroda ..................... G06T 1/60 345/536 |
| 2008/0068917 | A1 | | 3/2008 | Djordevic ................ 365/230.01 |
| 2008/0079743 | A1 | * | 4/2008 | Watanabe .............. H04N 19/61 345/537 |

* cited by examiner

*Primary Examiner* — Maria E Vazquez Colon
(74) *Attorney, Agent, or Firm* — Christopher P. Maiorana, PC

(57) ABSTRACT

An apparatus generally having a plurality of memories and a first circuit is disclosed. The memories may be configured to store a plurality of first data points. The first data points generally form a two-dimensional block. The first data points may be arranged among the memories such that a load cycle from the memories accesses a rectangular region of the two-dimensional block. The load cycle generally comprises a plurality of read cycles, a different one of the read cycles corresponding to each one of the memories. The first circuit may be configured to (i) receive the first data points as read from the memories and (ii) generate a plurality of second data points by a video codec transformation of the first data points between a spatial domain and a frequency domain.

18 Claims, 11 Drawing Sheets

16

16

16

16

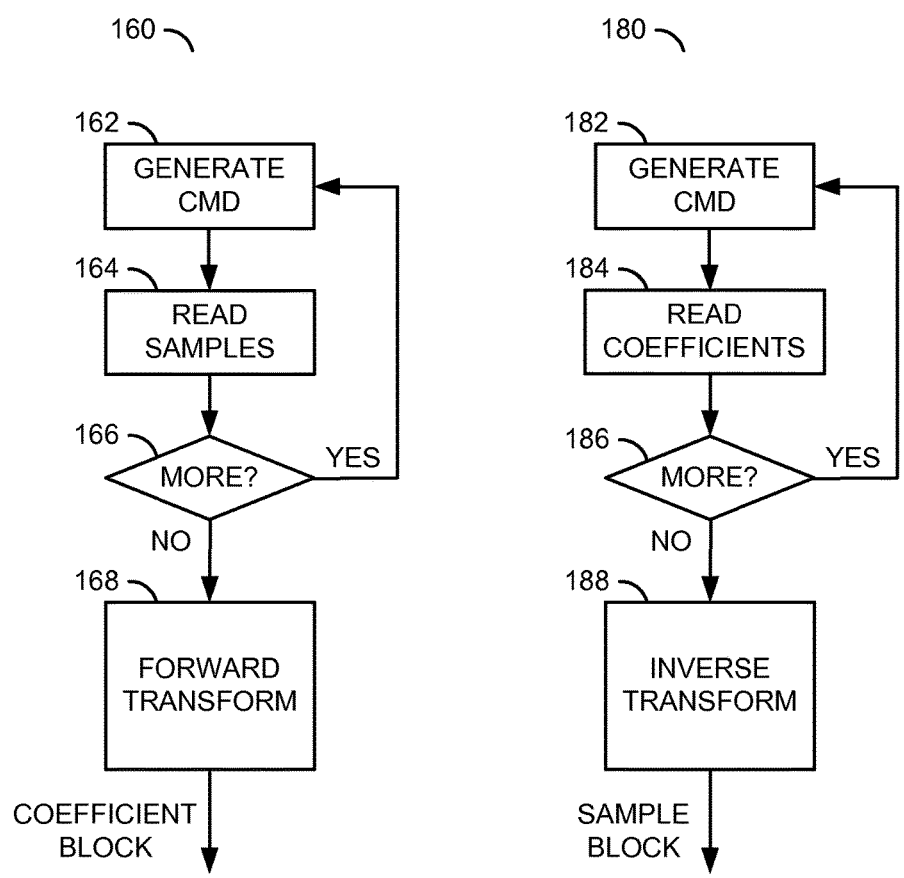

| 200 | | | |
|---|---|---|---|
| 0_M1<br>2_M0<br>4_M0<br>6_M1 | 0_M0<br>2_M1<br>4_M1<br>6_M0 | 1_M1<br>3_M0<br>5_M0<br>7_M1 | 1_M0<br>3_M1<br>5_M1<br>7_M0 |
| 8_M1<br>10_M0<br>12_M0<br>14_M1 | 8_M0<br>10_M1<br>12_M1<br>14_M0 | 9_M1<br>11_M0<br>13_M0<br>15_M1 | 9_M0<br>11_M1<br>13_M1<br>15_M0 |
| 16_M1<br>18_M0<br>20_M0<br>22_M1 | 16_M0<br>18_M1<br>20_M1<br>22_M0 | 17_M1<br>19_M0<br>21_M0<br>23_M1 | 17_M0<br>19_M1<br>21_M1<br>23_M0 |
| 24_M1<br>26_M0<br>28_M0<br>30_M1 | 24_M0<br>26_M1<br>28_M1<br>30_M0 | 25_M1<br>27_M0<br>29_M0<br>31_M1 | 25_M0<br>27_M1<br>29_M1<br>31_M0 |

FIG. 11

| 220 | | | |
|---|---|---|---|
| 0_M0<br>1_M1<br>2_M2<br>3_M3 | 0_M3<br>1_M2<br>2_M1<br>3_M0 | 0_M2<br>1_M3<br>2_M0<br>3_M1 | 0_M1<br>1_M0<br>2_M3<br>3_M2 |
| 4_M3<br>5_M2<br>6_M1<br>7_M0 | 4_M0<br>5_M1<br>6_M2<br>7_M3 | 4_M1<br>5_M0<br>6_M3<br>7_M2 | 4_M2<br>5_M3<br>6_M0<br>7_M1 |
| 8_M0<br>9_M1<br>10_M2<br>11_M3 | 8_M3<br>9_M2<br>10_M1<br>11_M0 | 8_M2<br>9_M3<br>10_M0<br>11_M1 | 8_M1<br>9_M0<br>10_M3<br>11_M2 |
| 12_M3<br>13_M2<br>14_M1<br>15_M0 | 12_M0<br>13_M1<br>14_M2<br>15_M3 | 12_M1<br>13_M0<br>14_M3<br>15_M2 | 12_M2<br>13_M3<br>14_M0<br>15_M1 |

FIG. 15

MEMORY ACCESS ORDERING FOR A TRANSFORMATION

This application relates to U.S. Ser. No. 12/692,835, filed Jan. 25, 2010, which is incorporated by reference in its entirety.

FIELD OF THE INVENTION

The present invention relates to a method and/or architecture for video codecs generally and, more particularly, to a memory access reordering for a transformation.

BACKGROUND OF THE INVENTION

In video compression, samples or coefficients are transformed block by block inside a macroblock. Referring to FIG. 1, a conventional 16 horizontal (H) by 16 vertical (V) luminance macroblock 20 is shown. Some video compression standards allow different transform partitions sizes mixed inside the macroblock 20 and different sub-partitions inside the 8H×8V partitions. Depending on the compression standard, the transform partitions/sub-partitions can have sizes of 8H×8V, 8H×4V, 4H×8V, or 4H×4V.

Referring to FIGS. 2A-2D, block diagrams of conventional block access orderings based on different block partitions/sub-partitions is shown. Partition/sub-partition 0 is transformed first, partition/sub-partition 1 is transformed second, and so on until the last partition/sub-partition (e.g., 3, 7 or 15) is transformed. Some video compression standards allow the transform size to change macroblock by macroblock and provide hardware to handle different transform sizes with the same performance. Furthermore, some video compression standards support different transform types (i.e., frame transform or field transform). For a frame transform, a block of every line is used in the transform. For a field transform, a block of every other line is used in the transform.

When a transform block size is four data points (i.e., samples or coefficients) in a horizontal direction, sets of four contiguous data points are entered into the transform. When the transform block size is eight data points in the horizontal direction, sets of 8 contiguous data points are entered into the transform.

What is desired is a memory organization that may access eight or more contiguous data points in each clock cycle, regardless transform block size and transform type.

SUMMARY OF THE INVENTION

The present invention concerns an apparatus generally having a plurality of memories and a first circuit. The memories may be configured to store a plurality of first data points. The first data points generally form a two-dimensional block. The first data points may be arranged among the memories such that a load cycle from the memories accesses a rectangular region of the two-dimensional block. The load cycle generally comprises a plurality of read cycles, a different one of the read cycles corresponding to each one of the memories. The first circuit may be configured to (i) receive the first data points as read from the memories and (ii) generate a plurality of second data points by a video codec transformation of the first data points between a spatial domain and a frequency domain.

The objects, features and advantages of the present invention include providing a memory access reordering for a transformation that may (i) provide a hardware-only implementation, (ii) access multiple memories in parallel, (iii) access the memories in different orders based on transform sizes, (iv) access the memories in different orders based on transform type, (v) maintain a memory throughput independent of the access orders, (vi) transfer multiple data points in each read cycle, (vii) access 8 data points per clock cycle and/or (viii) access 16 data points per clock cycle.

BRIEF DESCRIPTION OF THE DRAWINGS

These and other objects, features and advantages of the present invention will be apparent from the following detailed description and the appended claims and drawings in which:

FIG. 9 is a functional flow diagram of an example forward transform process;

FIG. 10 is a functional flow diagram of an example inverse transform process;

FIG. 11 is a diagram of a first example ordering of the data points of a macroblock within two memories;

FIG. 15 is a block a diagram of a second example ordering of the data points of the macroblock within four memories.

DETAILED DESCRIPTION OF THE PREFERRED EMBODIMENTS

Video is generally a sequence of pictures. Each picture may be divided into macroblocks. A macroblock is generally defined as 16H×16V region of two-dimensional samples. In video compression, luminance samples and chrominance samples of the macroblocks may be forward transformed block by block to convert from a spatial domain to a frequency domain. In decompression, transform coefficients may be inverse transformed block by block to reconstruct the samples.

A macroblock may be divided into one or more blocks generally referred to as partitions. Each of the partition may be further divided into one or more sub-partitions. A transform block may take on several sizes (e.g., 8H×8V, 8H×4V, 4H×8V, or 4H×4V). The block size may change per macroblock. Some video compression standards may allow different transform sizes inside a luminance macroblock on an 8H×8V basis. Typically, coefficients or samples are stored inside memory in hardware and accessed differently based on the different transform block sizes.

Some embodiments of the present invention use multiple (e.g., M) instances of memory and assign addresses to data points (e.g., luminance samples, chrominance samples or transform coefficients) so that multiple data points may be accessed on each load cycle. Each of the data points may be represented as several (e.g., 8) bits. The accesses are generally based on different transform block sizes and/or transform types. A load cycle is generally performed in each clock cycle. Some embodiments may use two instances of the memories and transfer several (e.g., N=4) data points per address such that eight data points may be read from the memories during a single clock cycle. Other embodiments may use four instances of the memories and transfer four data points per address such that sixteen data points may be read during a single clock cycle. Other numbers of memory instances and data points per read cycle may be implemented to meet the criteria of a particular application.

The data points generally form a two-dimensional block (e.g., a spatial block of video samples or a frequency block of transform coefficients) associated with a video field or video frame. The data points may be positioned among the memories such that each load cycle accesses a rectangular region of the two-dimensional block. Therefore, a sequence of one or more appropriate load commands may (i) cover different shaped and sized regions and (ii) accommodate different transform types (e.g., field transforms and frame transforms).

Figure 3:
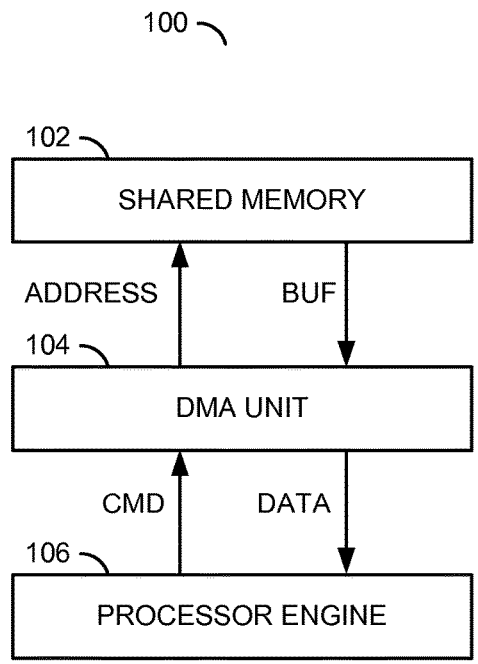
FIG. 3 is a block diagram of an apparatus in accordance with a preferred embodiment of the present invention.

Referring to FIG. 3, a block diagram of an apparatus 100 is shown in accordance with a preferred embodiment of the present invention. The apparatus (or system) 100 generally comprises a circuit (or module) 102, a circuit (or module) 104 and a circuit (or module) 106. A signal (e.g., BUF) may be generated by the circuit 102 and received by the circuit 104. The circuit 104 may generate a signal (e.g., ADDRESS) that is received by the circuit 102. A signal (e.g, DATA) may be generated by the circuit 104 and received by the circuit 106. The circuit 106 may generate a signal (e.g., CMD) that is received by the circuit 104. In some embodiments, each of the circuit 102-106 may be implemented in only hardware. In other embodiments, the circuit 102-106 may be implemented in hardware, software, firmware or any combination thereof.

The circuit 102 may implement a shared memory system. The circuit 102 is generally operational to buffer data used by the circuit 106. The circuit 102 may be logically configured as one or more memories (or buffers) allocated to a portion of the shared memory and associated control registers. The address signal ADDRESS may be used to access the memories. The data points read from the circuit 102 may be presented to the circuit 104 in the signal BUF.

The circuit 104 may implement a Direct Memory Access (DMA) unit. The circuit 104 is generally operational to load data from the circuit 102 to the circuit 106 in response to a load command received from the circuit 106 in the signal CMD. The circuit 104 may generate multiple address values in the signal ADDRESS to read the requested data from the memories within the circuit 102. The signal ADDRESS may form part of a read cycle that generally reads several (e.g., 4) data points from the circuit 102 as a single word. Each read cycle may be designed to read the data points in a single clock cycle. The multiple address values in the signal ADDRESS may be presented to the circuit 102 either in parallel or sequentially. The multiple data points may be received by the circuit 104 via the signal BUF from the circuit 102 either in parallel or sequentially. The data received by the circuit 104 in the signal BUF may be passed along to the circuit 106 in the signal DATA.

The circuit 106 may implement a processor circuit. The circuit 106 is generally operational to (i) initiate a load cycle be generating the signal CMD and (ii) perform a transform of an inverse transform on the data points received in the signal DATA. Each load cycle may be designed to request the data points from the circuit 102 in a single clock cycle. The transform operation may transform (convert) blocks of video samples (e.g., luminance samples and chrominance samples) received in the signal DATA from a spatial domain to a frequency domain. The inverse transform operation may transform (covert) blocks of transform coefficients received in the signal DATA from the frequency domain to the spatial domain.

Figure 4:
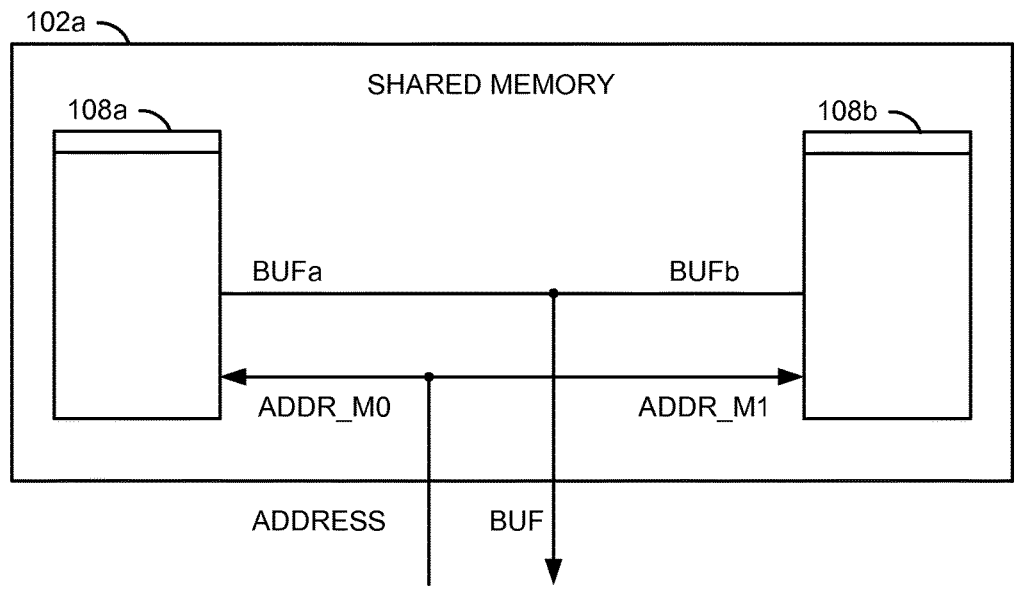
FIG. 4 is a block diagram of a first example implementation of a memory circuit.

Referring to FIG. 4, a block diagram of a first example implementation of the circuit 102 is shown. The first example implementation of the circuit 102 may be referred to as a circuit (or module) 102a. The circuit 102a generally comprises multiple (e.g., M=2) memories (or buffers) instances 108a-108b. The memory instances 108a-108b may be set up and torn down as appropriate. The signal ADDRESS may be divided within the circuit 102a into a signal (e.g., ADDRESS_M1) and a signal (e.g., ADDRESS_M0). The signal ADDRESS_M0 is generally used to address the memory instance 108a. The signal ADDRESS_M1 may be used to address the memory instance 108b. A signal (e.g., BUFa) may be generated by the circuit 108a to convey the data points read from the memory 108a. A signal (e.g., BUFb) may be generated by the circuit 108b to convey the data points read from the memory 108b. The signals BUFa and BUFb may be combined internal to the circuit 102a to create the signal BUF.

Figure 5:
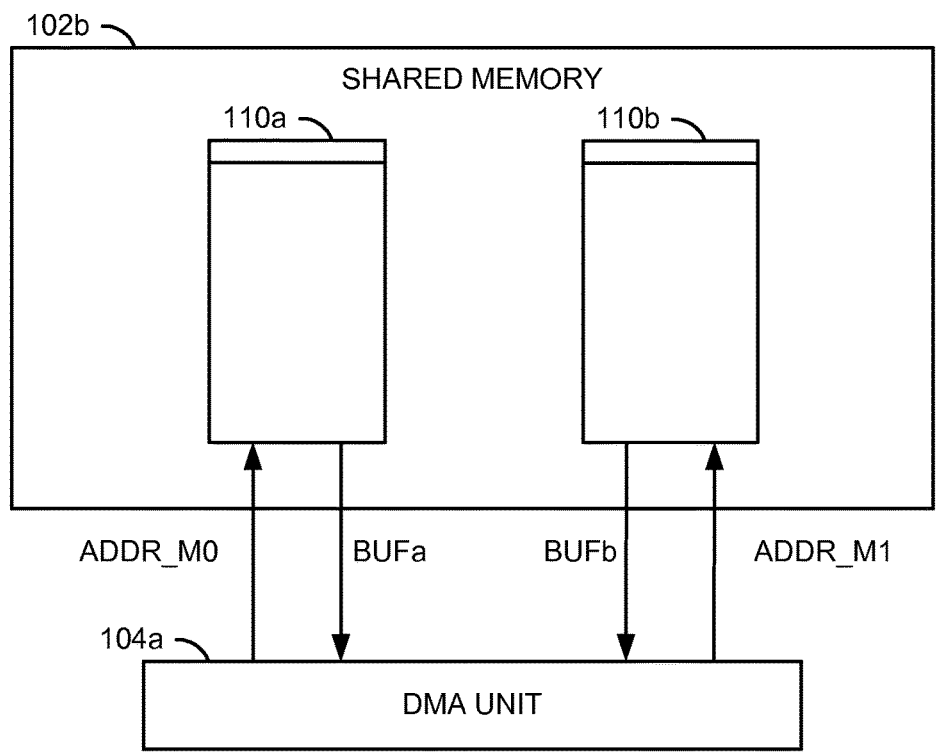
FIG. 5 is a block diagram of a second example implementation of the memory circuit.

Referring to FIG. 5, a block diagram of a second example implementation of the circuit 102 is shown. The second example implementation of the circuit 102 may be referred to as a circuit (or module) 102b. A corresponding example implementation of the circuit 104 may be referred to as a circuit (or module) 104a. The circuit 102b may comprise multiple (e.g., M=2) circuits (or modules) 110a-110b. The circuits 110a and 110b may be physically separate memories from each other. The signal ADDRESS may be generated by the circuit 104a as the signal ADDR_M0 and the signal ADDR_M1. The signal ADDR_M1 is generally used to address the circuit 110a. The signal ADDR_M1 may be used to address the circuit 110b. The signal BUF received by the circuit 104a may comprise the signal BUFa and the signal BUFb. The signal BUFa may be generated by the circuit 110a to convey the data points read from the circuit 110a. The signal BUFb may be generated by the circuit 110b to convey the data points read from the circuit 110b.

Figure 6:
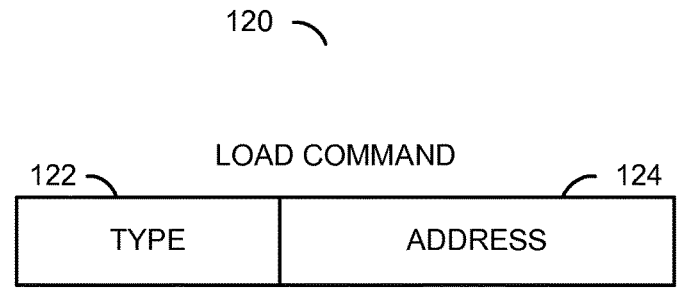
FIG. 6 is a block diagram of an example load command.

Referring to FIG. 6, a block diagram of an example load command 120 is shown. The load command (or instruction) 120 may be generated by the circuit 106 and presented to the circuit 104 in the signal CMD. The command 120 generally comprises a type field (or parameter) 122 and an address field (or parameter) 124. The type field 122 is generally used to define a shape of the region of data points read from the circuit 102 in a single load cycle. Where the circuit 102 is implemented with two memories, the type field 122 may contain a first value (e.g., zero) to indicate that a 1H×8V region (or set) of data points may be read. A second value (e.g., one) in the type field 122 may be used to indicate that a 2H×4V region (or set) of data points may be read from the circuit 102. The address field 124 generally carries an address value where the requested set of data points are stored. The address value may be a logical address in some embodiments and a physical address in other embodiments.

Figure 7:
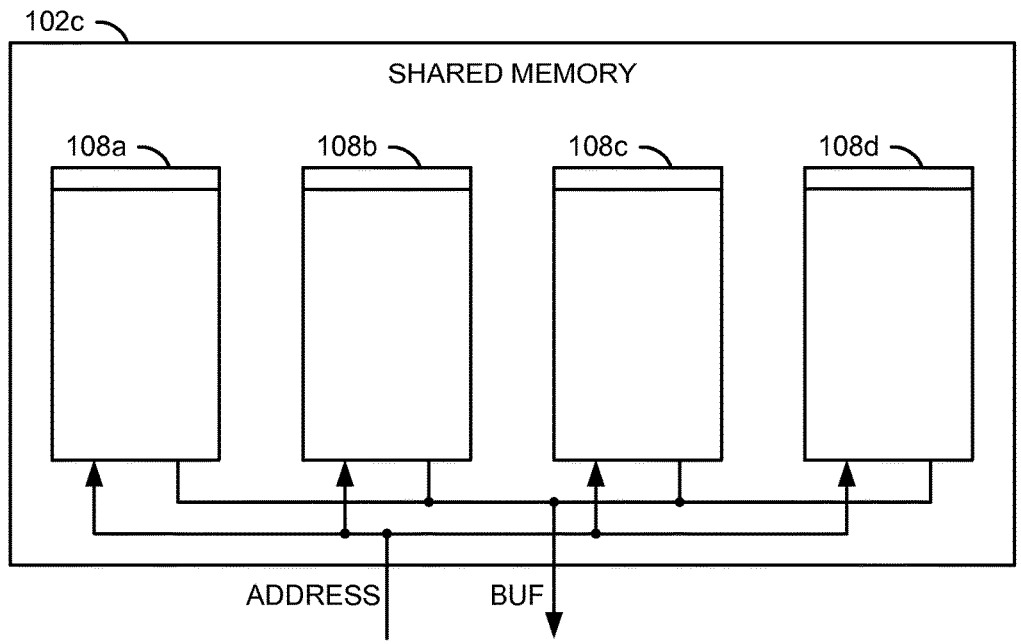
FIG. 7 is a block diagram of a third example implementation of the memory circuit.

Referring to FIG. 7, a block diagram of a third example implementation of the circuit 102 is shown. The third example implementation of the circuit 102 may be referred to as a circuit (or module) 102c. The circuit 102c may comprise multiple (e.g., M=4) memories (or buffers) instances 108a-108d. The memory instances 108a-108d may be set up and torn down as appropriate. The signal ADDRESS may be divided within the circuit 102c into separate address signals, a different address signal for each of the memory instances 108a-108d. The data points read from the individual memory instances 108a-108d may be combined within the circuit 102c into the signal BUF.

Figure 8:
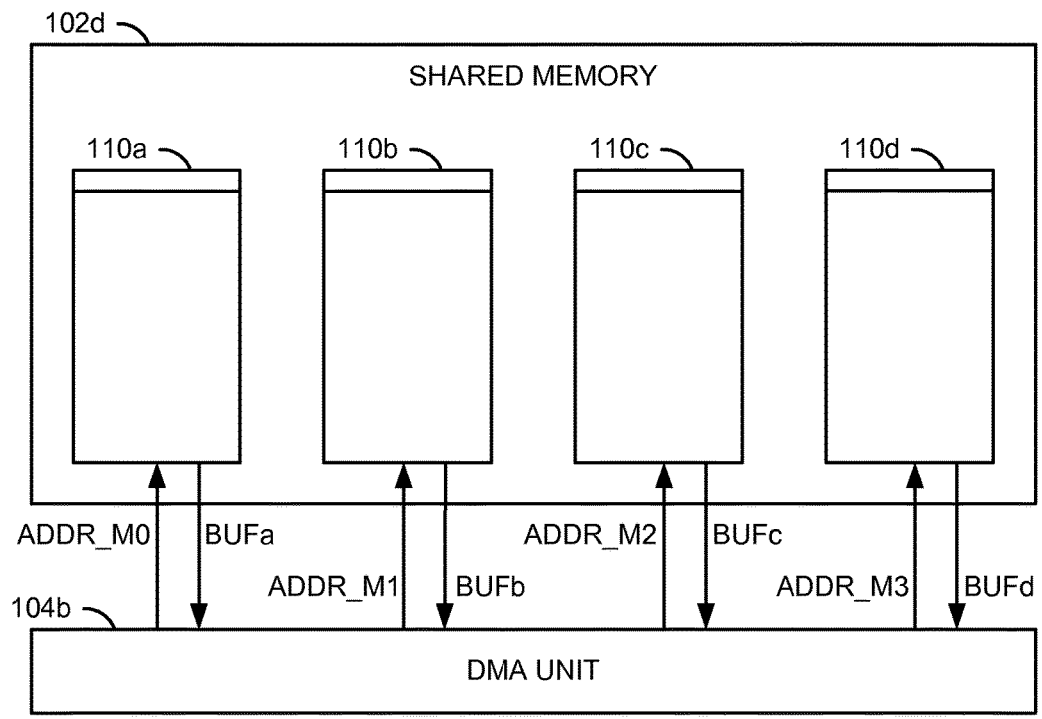
FIG. 8 is a block diagram of a fourth example implementation of the memory circuit.

Referring to FIG. 8, a block diagram of a fourth example implementation of the circuit 102 is shown. The fourth example implementation of the circuit 102 may be referred to as a circuit (or module) 102d. A corresponding implementation of the circuit 104 may be referred to as a circuit (or module) 104b. The circuit 102d may comprise multiple (e.g., M=4) circuits 110a-110d. The circuits 110a-110d may be physically separate memories from each other. The signal ADDRESS may be generated by the circuit 104b as separate signals (e.g., ADDR_M0, ADDR_M1, ADDR_M2 and ADDR_M3). The signal BUF received by the circuit 104b may comprise separate signals (e.g., BUFa, BUFb, BUFc and BUFd).

Returning to FIG. 6, where the circuit 102 contains four memories, the type field 122 may define more than two types of load cycles. For example, the first value in the type field 122 may indicate a 1H×16V region (or set) of data points. The second value in the type field 122 may indicate a 2H×8V region (or set) of data paints. A third value in the type field 122 may indicate a 4H×4V region (or set) of data points. Other region shapes and sizes may be indicated in the type field 122 to meet the criteria of a particular application.

Referring to FIG. 9, a functional flow diagram of an example forward transform process 160 is shown. The process (or method) 160 may be implemented by the circuit 100. The process 160 generally comprises a step (or block) 162, a step (or block) 164, a step (or block) 166 and a step (or block) 168.

In the step 162, the circuit 106 may generate a command to load data points (e.g., video samples) from the circuit 102 to the circuit 106. The circuit 104 may respond to the load command in the step 164 by generating the signal ADDRESS to transfer data points from the circuit 102, through the circuit 104 to the circuit 106. In the step 166, the circuit 106 may determine if more data points should be read from the circuit 102. If more data points should be read (e.g., the YES branch of step 166), the circuit 106 may issue another command with a new address value in the step 162. Once all of the data points have been received by the circuit 106 (e.g., the NO branch of step 166), the circuit 106 may perform a forward transform on the data points in the step 168 to generate a block of transform coefficients.

Referring to FIG. 10, a functional flow diagram of an example inverse transform process 180 is shown. The process (or method) 180 may be implemented by the circuit 100. The process 180 generally comprises a step (or block) 182, a step (or block) 184, a step (or block) 186 and a step (or block) 188.

In the step 182, the circuit 106 may generate a command to load data points (e.g., transform coefficients) from the circuit 102 to the circuit 106. The circuit 104 may respond to the load command in the step 184 by generating the signal ADDRESS to transfer data points from the circuit 102, through the circuit 104 to the circuit 106. In the step 186, the circuit 106 may determine if more data points should be read from the circuit 102. If more data points should be read (e.g., the YES branch of step 186), the circuit 106 may issue another command with a new address value in the step 182. Once all of the data points have been received by the circuit 106 (e.g., the NO branch of step 186), the circuit 106 may perform an inverse transform on the data points in the step 188 to generate a block of recreated video samples.

Referring to FIG. 11, a diagram of a first example ordering of the data points of a macroblock 200 within two memories (e.g., M0 and M1) is shown. Groups of data points (e.g., four data points) may be stored in each addressable word of the memories M0 and M1. A top row of the data points may be allocated to the first two addressable locations in the memories M0 and M1. In particular, the top leftmost four data points may be stored at address 0 in the memory M1. Moving to the right, the next top four data points may be stored at address 0 in the memory M0. The next top four data points may be stored at address 1 in the memory M1. The top rightmost four data points may be stored at the address 1 in the memory M0. The other rows of data points may be arranged in a similar fashion. Generally, the data points are organized among the memories M0 and M1 such that simultaneous reads from both memories M0 and M1 returns a rectangular region of the block 200. For example, a type 0 read from addresses 8_M1 and 8_M0 may return 8 data points in a 1H×8V arrangement. A type 1 read from address 8_M1 and 10_M0 may return 8 data points in a 4H×2V arrangement. Other organizations of the data points within the memories may be implemented to meet the criteria of a particular application. To reach a similar performance regardless transform block size, when accessing 8 data points in each clock cycle, in the case of a 4H×4V transform block, two rows of two 4-data point words may be accessed at the same clock cycle. In the case of an 8H×8V transform block, a single row of two 8-data point words may be accessed at the same clock cycle.

Figure 12:
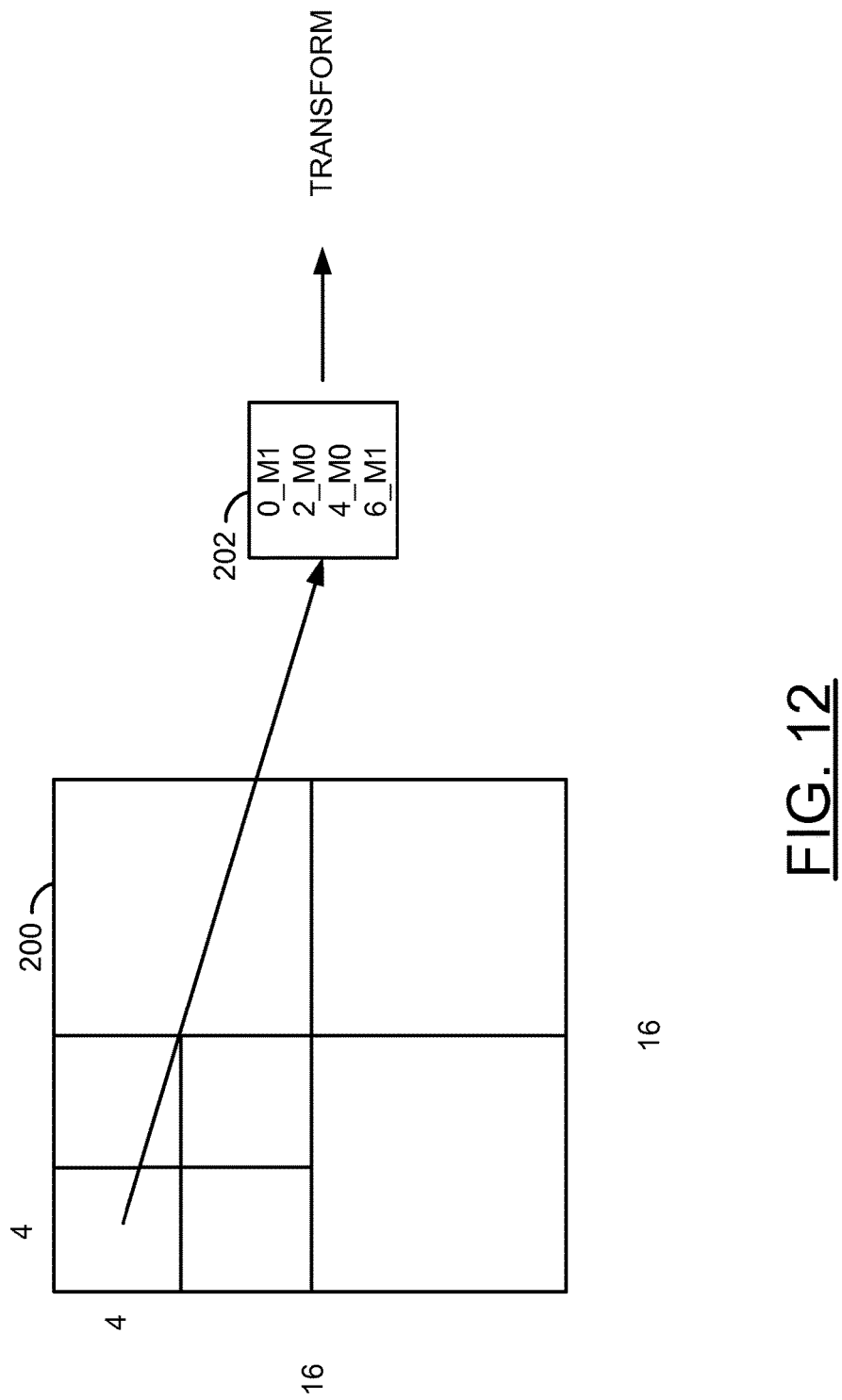
FIG. 12 is a block diagram of an example read of a 4H×4V transform block of the macroblock from two memories.

Referring to FIG. 12, a block diagram of an example read of a 4H×4V transform block 202 of the macroblock 200 from two memories is shown. The transform block 202 is generally accessed as a two-dimensional block. Since four contiguous data points are generally stored in memory as a word, the 16 data points of the transform block 202 may be read in two load cycles. A first load cycle may return the eight data points from the address 0 of the memory M1 and from the address 2 of the memory M0. A second load cycle may return the eight data points from the address 4 of the memory M0 and from the address 6 of the memory M1. As each load cycle may be completed in a clock cycle, the transform block 202 may be read from the circuit 102 in two clock cycles.

Figure 13:
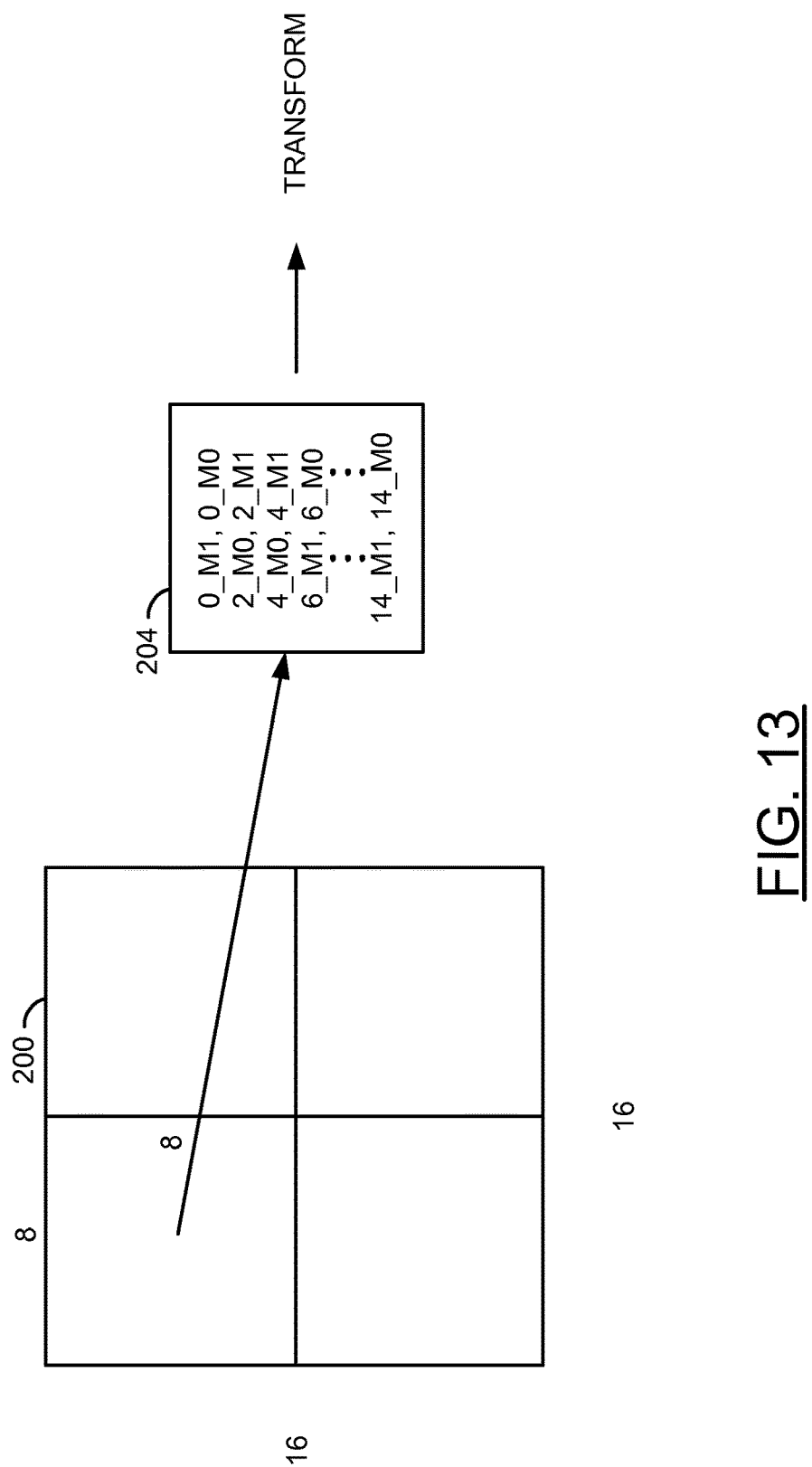
FIG. 13 is a block diagram of an example read of an 8H×8V transform block of the macroblock from two memories.

Referring to FIG. 13, a block diagram of an example read of an 8H×8V transform block 204 of the macroblock 200 from two memories is shown. Since four contiguous data points are generally stored in memory as a word, the 64 data points of the transform block 204 may be read in four load cycles. A first load cycle may return the eight data points from the address 0 of the memory M1 and from the address 0 of the memory M0. A second load cycle may return the eight data points from the address 2 of the memory M0 and from the address 2 of the memory M1. A third load cycle may return the eight data points form the address 4 of the memory M0 and from the address 4 of the address M1. A fourth load cycle may return the eight data points from the address 6 of the memory M1 and from the address 6 of the memory M0. The load cycles may be continued until the last eight data points from the address 14 of the memory M1 and the address 14 of the memory M0 are accessed. As each load cycle may be completed in a clock cycle, the transform block 204 may be read from the circuit 102 in eight clock cycles.

Figure 1:
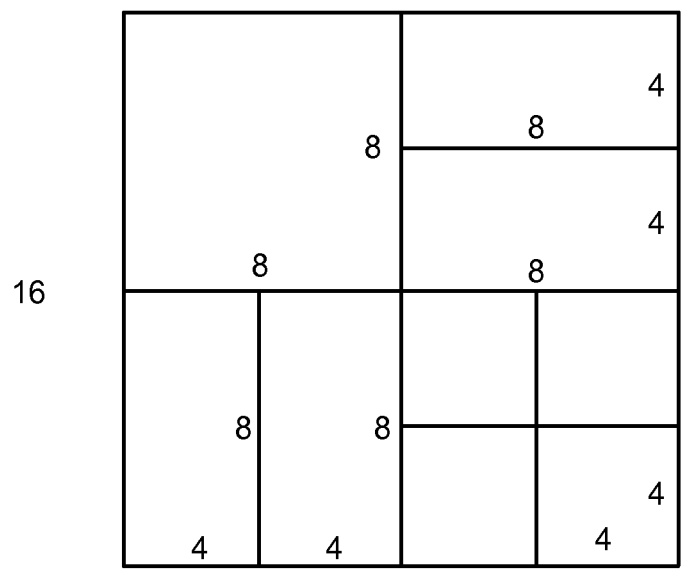
FIG. 1 is block diagram of a conventional 16 horizontal by 16 vertical luminance macroblock.
Figure 2A:
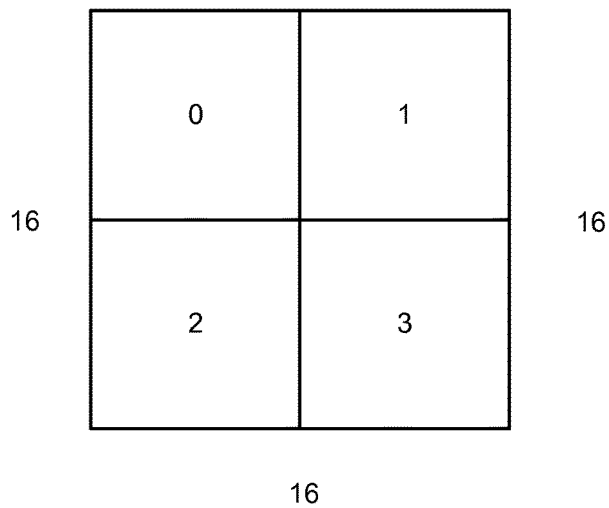
FIGS. 2A-2D are block diagrams of conventional block access orderings based on different block partitions/sub-partitions.

Access to the four 8H×8V blocks (FIG. 2A) may be achieved using the following load cycles:

| | Load Cycle | Addresses |
|---|---|---|
| Block 0: | 0 | 0_M1, 0_M0 |
| | 1 | 2_M0, 2_M1 |
| | 2 | 4_M0, 4_M1 |
| | 3 | 6_M1, 6_M0 |
| | 4 | 8_M1, 8_M0 |
| | 5 | 10_M0, 10_M1 |
| | 6 | 12_M0, 12_M1 |
| | 7 | 14_M1, 14_M0 |
| Block 1: | 8 | 1_M1, 1_M0 |
| | 9 | 3_M0, 3_M1 |
| | 10 | 5_M0, 5_M1 |
| | 11 | 7_M1, 7_M0 |
| | 12 | 9_M1, 9_M0 |
| | 13 | 11_M0, 11_M1 |
| | 14 | 14_M0, 13_M1 |
| | 15 | 15_M1, 15_M0 |

Block 2 and Block 3 may be accessed in a similar manner.

Figure 2B:
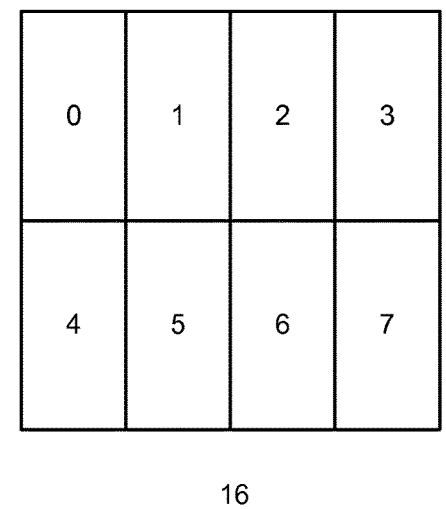

If the blocks size is 4 columns by 8 rows (FIG. 2B), the data points may be accessed in each load cycle as follows:

| | Load Cycle | Addresses |
|---|---|---|
| Block 0: | 0 | 0_M1, 2_M0 |
| | 1 | 4_M0, 6_M1 |
| | 2 | 8_M1, 10_M0 |
| | 3 | 12_M0, 14_M1 |
| Block 1: | 4 | 0_M0, 2_M1 |
| | 5 | 4_M1, 6_M0 |
| | 6 | 8_M0, 10_M1 |
| | 7 | 12_M1, 14_M0 |
| Block 2: | 8 | 1_M1, 3_M0 |
| | 9 | 5_M0, 7_M1 |
| | 10 | 9_M1, 11_M0 |
| | 11 | 13_M0, 15_M1 |

Blocks 3 to 7 may be accesses in a similar manner.

Figure 2C:
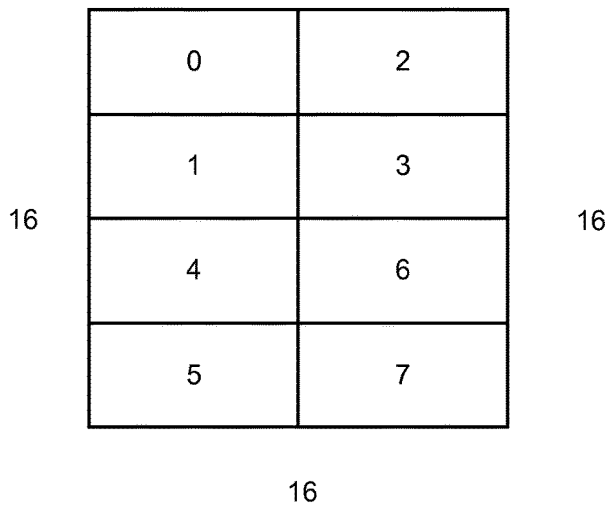

If the block size is 8 columns by 4 rows (FIG. 2C), the data points may be accessed in each load cycle as follows:

| | Load Cycle | Addresses |
|---|---|---|
| Block 0: | 0 | 0_M1, 0_M0 |
| | 1 | 2_M0, 2_M1 |
| | 2 | 4_M0, 4_M1 |
| | 3 | 6_M1, 6_M0 |
| Block 1: | 4 | 8_M1, 8_M0 |
| | 5 | 10_M0, 10_M1 |
| | 6 | 12_M0, 12_M1 |
| | 7 | 14_M1, 14_M0 |
| Block 2: | 8 | 1_M1, 1_M0 |
| | 9 | 3_M0, 3_M1 |
| | 10 | 5_M0, 5_M1 |
| | 11 | 7_M1, 7_M0 |

Blocks 3 to 7 may be accesses in a similar manner.

Figure 2D:
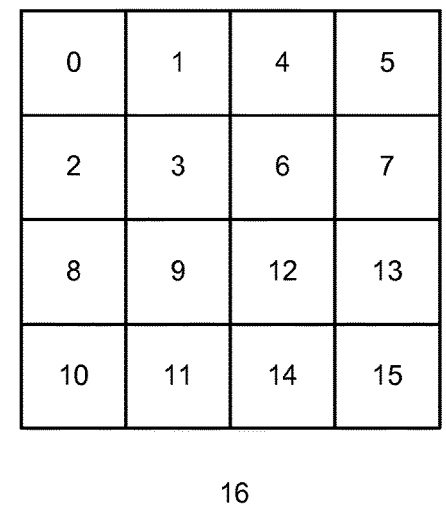

If the block size is 4 columns by 4 rows (FIG. 2D), the data points may be accessed in each load cycle as follows:

| | Load Cycle | Addresses |
|---|---|---|
| | | Block 0: |
| | 0 | 0_M1, 2_M0 |
| | 1 | 4_M0, 6_M1 |
| | | Block 1: |
| | 2 | 0_M0, 2_M1 |
| | 3 | 4_M1, 6_M0 |
| | | Block 2: |
| | 4 | 8_M1, 10_M0 |
| | 5 | 12_M0, 14_M1 |
| | | Block 3: |
| | 6 | 8_M0, 10_M1 |
| | 7 | 12_M1, 14_M0 |
| | | Block 4: |
| | 8 | 1_M1, 3_M0 |
| | 9 | 5_M0, 7_M1 |

Blocks 5 to 15 may be accessed in a similar manner.

Figure 14:
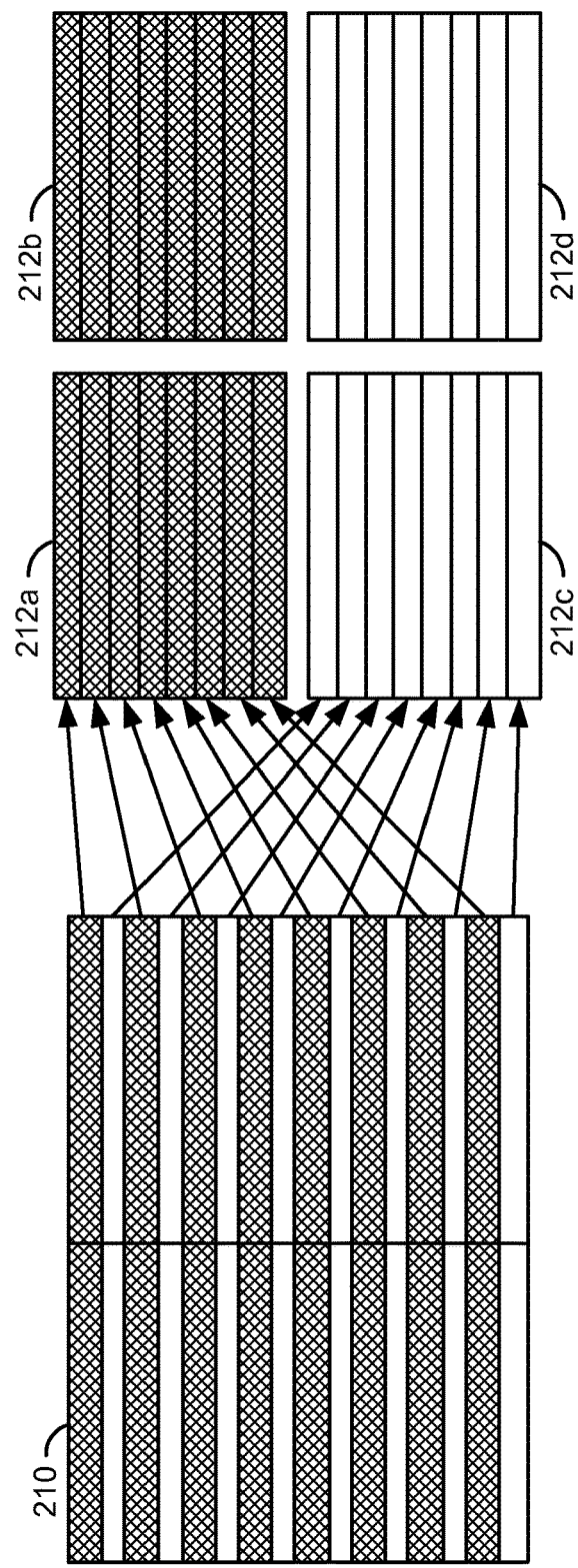
FIG. 14 is a block diagram of an example reordering inside a luminance frame block into field blocks.

Referring to FIG. 14, a block diagram of an example reordering inside a luminance frame block 210 into field blocks 212a-212d is shown. For a frame picture, the transform function may be applied to a frame block (e.g., every line inside a luminance macroblock) or the field blocks (e.g., every other line inside the luminance macroblock). To access eight samples each clock cycle, every other line may be accessed from the frame block 210 to establish the field blocks 212a-212d.

To access eight data points from two memories M0 and M1 on every other line of the block 212 in each clock cycle, the following address assignments may be used:

| | Block 0: | |
|---|---|---|
| Load Cycle | Addresses (odd lines into block 212a) | |
| 0 | 0_M1, 0_M0 | |
| 1 | 4_M0, 4_M1 | |
| 2 | 8_M1, 8_M0 | |
| 3 | 12_M0, 12_M1 | |
| 4 | 16_M1, 16_M0 | |
| 5 | 20_M0, 20_M1 | |
| 6 | 24_M1, 24_M1 | |
| 7 | 28_M0, 28_M1 | |

| | Block 1: | |
|---|---|---|
| Load Cycle | Addresses (odd lines into block 212b) | |
| 8 | 1_M1, 1_M0 | |
| 9 | 5_M0, 5_M1 | |
| 10 | 9_M1, 9_M0 | |
| 11 | 13_M0, 13_M1 | |
| 12 | 17_M1, 17_M0 | |
| 13 | 21_M0, 21_M1 | |
| 14 | 25_M1, 25_M0 | |
| 15 | 29_M0, 29_M1 | |

| | Block 2: | |
|---|---|---|
| Load Cycle | Addresses (even lines into block 212c) | |
| 16 | 2_M0, 2_M1 | |
| 17 | 6_M1, 6_M0 | |
| 18 | 10_M0, 10_M1 | |
| 19 | 14_M1, 14_M0 | |
| 20 | 18_M0, 18_M1 | |
| 21 | 22_M1, 22_M0 | |

-continued

| | |
|---|---|
| 22 | 26_M0, 26_M1 |
| 23 | 30_M1, 30_M0 |

Block 3:

| Load Cycle | Addresses (even lines into block 212d) |
|---|---|
| 24 | 3_M0, 3_M1 |
| 25 | 7_M1, 7_M0 |
| 26 | 11_M0, 11_M1 |
| 27 | 15_M1, 15_M0 |
| 28 | 19_M0, 19_M1 |
| 29 | 23_M1, 23_M0 |
| 30 | 27_M0, 27_M1 |
| 31 | 31_M1, 31_M0 |

Referring to FIG. 15, a block a diagram of a second example ordering of the data points of a macroblock 220 within four memories (e.g., M0-M3) is shown. Groups of data points (e.g., four data points) may be stored in each addressable word of the memories M0-M3. Generally, the data points are organized among the memories M0-M3 such that simultaneous reads from all four of the memories M0-M3 returns a rectangular region of the block 220. For example, a type 0 parallel read from addresses 8_M0, 8_M3, 8_M2 and 8_M1 may return 16 data points in a 1H×16V arrangement. A type 1 read from address 8_M0, 8_M3, 9_M1 and 9_M2 may return 16 data points in a 8H×2V arrangement. A type 2 read from addresses 8_M0, 9_M1, 10_M2 and 11_M3 may return 16 data points in a 4H×4V arrangement. Other organizations of the data points within the memories may be implemented to meet the criteria of a particular application. When accessing 16 data points in each clock cycle, in the case of a 4H×4V transform block, 4 rows of 4-sample words may be accessed at the same clock cycle. In the case of 8H×8V transform block, two rows of two 4-sample words may be accessed at the same clock cycle in each of two clock cycles.

If the transform block sizes are 8H×8V (FIG. 2A), 16 data points may be accessed from the memories in each clock cycle as following:

Block 0:

| Load Cycle | Addresses |
|---|---|
| 0 | 0_M0, 0_M3, 1_M1, 1_M2 |
| 1 | 2_M2, 2_M1, 3_M3, 3_M0 |
| 2 | 4_M3, 4_M0, 5_M2, 5_M1 |
| 3 | 6_M1, 6_M2, 7_M0, 7_M3 |

Blocks 1 to 3 may be accessed in a similar manner.

If a block size is 4H×4V (FIG. 2D), 16 data points may be read out from the memories in each of the clock cycle as follows:

Block 0:

| Load Cycle | Addresses |
|---|---|
| 0 | 0_M0, 1_M1, 2_M2, 3_M3 |

Blocks 1 to 15 may be accessed in a similar manner.

To access 16 samples in every other line inside a frame macroblock during each clock cycle for an 8H×8V block, the following address assignments may be used:

Block 0:

| Load Cycle | Addresses (odd lines) |
|---|---|
| 0 | 0_M0, 0_M3, 2_M2, 2_M1 |
| 1 | 4_M3, 4_M0, 6_M1, 6_M2 |
| 2 | 8_M0, 8_M3, 10_M2, 10_M1 |
| 3 | 12_M3, 12_M0, 14_M1, 14_M2 |

Block 1:

| Load Cycle | Addresses (odd lines) |
|---|---|
| 0 | 0_M2, 0_M1, 2_M0, 2_M3 |
| 1 | 4_M1, 4_M2, 6_M3, 6_M0 |
| 2 | 8_M2, 8_M1, 10_M0, 10_M3 |
| 3 | 12_M1, 12_M2, 14_M3, 14_M0 |

Block 2:

| Load Cycle | Addresses (even lines) |
|---|---|
| 0 | 1_M1, 1_M2, 3_M3, 3_M0 |
| 1 | 5_M2, 5_M1, 7_M0, 7_M3 |
| 2 | 9_M1, 9_M2, 11_M3, 11_M0 |
| 3 | 13_M2, 13_M1, 15_M0, 15_M3 |

Block 3:

| Load Cycle | Addresses (even lines) |
|---|---|
| 0 | 1_M3, 1_M0, 3_M1, 3_M2 |
| 1 | 5_M0, 5_M3, 7_M2, 7_M1 |
| 2 | 9_M3, 9_M0, 11_M1, 11_M2 |
| 3 | 13_M0, 13_M3, 15_M2, 15_M1 |

Address assignment in addition to the assignments shown in FIGS. 11 and 15 may be implemented to meet the criteria of a particular application. For example, an address offset of the data points within the memories may start from zero or any other number. The order of the addresses may also be changed as long as parallel accesses to all of the memories return rectangular regions. If more data points should be accessed in each load cycle, more memory instances may be created and/or wider data words (e.g., 64-bit words, N=8, etc.) may be implemented.

Embodiments of the present invention may maintain memory access performance by a special arrangement data in multiple memories. In some embodiments, data points may be arranged among two memories such that eight data points may be accessed in each clock regardless transform block sizes. In other embodiments, four memories may be implemented such that 16 data points may be accessed in each clock cycle.

The functions performed by the diagrams of FIGS. 3-15 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally executed from a medium or several media by one or more of the processors of the machine implementation.

The present invention may also be implemented by the preparation of ASICs (application specific integrated circuits), Platform ASICs, FPGAs (field programmable gate arrays), PLDs (programmable logic devices), CPLDs (complex programmable logic device), sea-of-gates, RFICs (radio frequency integrated circuits), ASSPs (application specific standard products) or by interconnecting an appropriate network of conventional component circuits, as is described herein, modifications of which will be readily apparent to those skilled in the art(s).

The present invention thus may also include a computer product which may be a storage medium or media and/or a transmission medium or media including instructions which may be used to program a machine to perform one or more processes or methods in accordance with the present invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMS (random access memories), EPROMs (electronically programmable ROMs), EEPROMs (electronically erasable ROMs), UVPROM (ultra-violet erasable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, storage and/or playback devices, video recording, storage and/or playback devices, game platforms, peripherals and/or multi-chip modules. Those skilled in the relevant art(s) would understand that the elements of the invention may be implemented in other types of devices to meet the criteria of a particular application. As used herein, the term "simultaneously" is meant to describe events that share some common time period but the term is not meant to be limited to events that begin at the same point in time, end at the same point in time, or have the same duration.

While the invention has been particularly shown and described with reference to the preferred embodiments thereof, it will be understood by those skilled in the art that various changes in form and details may be made without departing from the spirit and scope of the invention.

The invention claimed is:

1. An apparatus comprising:
   an interface configured to communicate with a plurality of memories that store a plurality of data points; and
   a circuit configured to (i) receive a command from another circuit to perform a load cycle from said memories, wherein said command defines a rectangular region in either a spatial domain or a frequency domain, (ii) generate a plurality of read cycles based on said rectangular region defined in said command, (iii) receive said data points in said rectangular region as read from said memories through said interface in response to said read cycles and (iv) transfer said data points to said other circuit, wherein said interface and said circuit form a direct memory access unit, wherein (i) a first type of said load cycle accesses a frame block of said data points and (ii) a second type of said load cycle accesses a field block of said data points.

2. The apparatus according to claim 1, wherein (i) each of said read cycles causes a transfer of N of said data points at a time from said memories, respectively, to said circuit and (ii) said load cycle is a single load cycle.

3. The apparatus according to claim 2, wherein (i) said first type of said load cycle accesses said rectangular region with a 1×2N size and (ii) said second type of said load cycle accesses said rectangular region with a 2×N size.

4. The apparatus according to claim 2, wherein (i) said first type of said load cycle accesses said rectangular region with a 1×4N size, (ii) said second type of said load cycle accesses said rectangular region with a 2×2N size and (iii) a third type of said load cycle accesses said rectangular region with an N×N size.

5. The apparatus according to claim 1, wherein said memories comprise a plurality of physically separate memories.

6. The apparatus according to claim 1, wherein said memories are instantiated within a shared memory.

7. The apparatus according to claim 1, wherein said read cycles generate a sequence of address values in a single address signal in response to said command.

8. The apparatus according to claim 1, wherein said read cycles generate a plurality of address values in a plurality of parallel address signals in response to said command.

9. The apparatus according to claim 1, wherein said circuit is implemented only in hardware.

10. A method for memory access ordering, comprising the steps of:
    communicating with an interface to a plurality of memories that store a plurality of data points;
    receiving a command at a first circuit from a second circuit to perform a load cycle from said memories, wherein said command defines a rectangular region in either a spatial domain or a frequency domain;
    generating a plurality of read cycles based on said rectangular region defined in said command;
    receiving at said first circuit through said interface said data points in said rectangular region as read from said memories in response to said read cycles; and
    transferring said data points to said second circuit, wherein said interface and said first circuit form a direct memory access unit, wherein said read cycles generate a sequence of address values in a single address signal in response to said command.

11. The method according to claim 10, wherein (i) each of said read cycles causes a transfer of N of said data points at a time from said memories, respectively, to said circuit and (ii) said load cycle is a single load cycle.

12. The method according to claim 11, wherein
    (i) a first type of said load cycle accesses said rectangular region with a 1×2N size and (ii) a second type of said load cycle accesses said rectangular region with a 2×N size.

13. The method according to claim 11, wherein
    (i) a first type of said load cycle accesses said rectangular region with a 1×4N size, (ii) a second type of said load cycle accesses said rectangular region with a 2×2N size and (iii) a third type of said load cycle accesses said rectangular region with an N×N size.

14. The method according to claim 10, wherein (i) a first type of said load cycle accesses a frame block of said data points and (ii) a second type of said load cycle accesses a field block of said data points.

15. The method according to claim 10, wherein said memories comprise a plurality of physically separate memories.

16. The method according to claim 10, further comprising the step of:
instantiating all of said memories within a shared memory.

17. The method according to claim 10, wherein said read cycles generate a plurality of address values in plurality of parallel address signals in response to said command.

18. An apparatus comprising:
a plurality of memories that store a plurality of data points; and
a direct memory access unit having an interface connected to the memories and configured to (i) receive a command from a circuit to perform a load cycle from said memories, wherein said command defines a rectangular region in either a spatial domain or a frequency domain, (ii) generate a plurality of read cycles based on said rectangular region defined in said command, (iii) receive said data points in said rectangular region as read from said memories through said interface in response to said read cycles and (iv) transfer said data points to said circuit, wherein (i) each of said read cycles causes a transfer of N of said data points at a time from said memories, respectively, to said circuit and (ii) said load cycle is a single load cycle.

* * * * *